United States Patent
Blando et al.

(10) Patent No.: US 9,906,930 B2
(45) Date of Patent: Feb. 27, 2018

(54) SYSTEM AND METHOD FOR MOBILE PERSONAL EMERGENCY RESPONSE

(71) Applicant: GUARDLLAMA, INC., Chicago, IL (US)

(72) Inventors: Dominick S. Blando, Chicago, IL (US); Adam L. Havey, Chicago, IL (US); Joseph M. Parisi, Chicago, IL (US)

(73) Assignee: GuardLlama Inc., Chicago, IL (US)

( * ) Notice: Subject to any disclaimer, the term of this patent is extended or adjusted under 35 U.S.C. 154(b) by 0 days.

(21) Appl. No.: 14/683,564

(22) Filed: Apr. 10, 2015

(65) Prior Publication Data

US 2016/0302050 A1    Oct. 13, 2016

(51) Int. Cl.

| | | |
|---|---|---|
| *H04B 7/00* | (2006.01) | |
| *H04M 1/66* | (2006.01) | |
| *H04M 1/68* | (2006.01) | |
| *H04M 3/16* | (2006.01) | |
| *H04W 4/22* | (2009.01) | |
| *H04W 4/00* | (2018.01) | |
| *H04W 4/02* | (2018.01) | |
| *H04M 3/51* | (2006.01) | |
| *G06Q 50/26* | (2012.01) | |

(52) U.S. Cl.
CPC ............ *H04W 4/22* (2013.01); *G06Q 50/265* (2013.01); *H04M 3/5116* (2013.01); *H04W 4/008* (2013.01); *H04W 4/02* (2013.01)

(58) Field of Classification Search
CPC ......... H04W 4/02; H04W 4/22; H04W 4/043; H04W 4/04

USPC ........... 455/404.1, 404.2, 41.3, 557; 340/3.1, 340/5.17, 517, 426.2, 426.16, 508, 5.7, 340/5.71, 4.36, 539.1; 379/45

See application file for complete search history.

(56) References Cited

U.S. PATENT DOCUMENTS

| | | | | |
|---|---|---|---|---|
| 6,519,463 | B2 * | 2/2003 | Tendler ................ | H04M 3/493 455/404.2 |
| 6,759,956 | B2 * | 7/2004 | Menard .................... | G08B 1/08 340/517 |

(Continued)

OTHER PUBLICATIONS https://www.indiegogo.com/projects/eduprotect#/story—14 pages printed from the Internet on Aug. 19, 2015.

(Continued)

*Primary Examiner* — William D Cumming
(74) *Attorney, Agent, or Firm* — Banner & Witcoff, Ltd.

(57) ABSTRACT

A mobile personal emergency response system includes a security fob configured to be manually activated, and wirelessly transmit an emergency alert signal when activated. A mobile device contains an emergency application, which is responsive to the emergency alert signal. Upon receipt of the emergency alert signal, the emergency application obtains user profile data corresponding to the mobile device, obtains GPS location coordinates of the mobile device, and wirelessly transmits the user profile data and GPS location coordinates to a dispatch center. A location database is accessed by the dispatch center and provides an identity of a selected public service answering point corresponding to the received GPS location coordinates. A dispatcher of the dispatch center contacts the selected public service answering point and provides the user profile data and a location of the mobile device.

16 Claims, 8 Drawing Sheets

(56) References Cited

U.S. PATENT DOCUMENTS

| | | | | |
|---|---|---|---|---|
| 7,542,721 B1* | 6/2009 | Bonner | G08B 25/004 | 340/539.1 |
| 7,574,195 B2* | 8/2009 | Krasner | G08B 25/009 | 455/404.1 |
| 7,701,331 B2* | 4/2010 | Tran | G07C 9/00309 | 340/5.7 |
| 7,904,053 B2* | 3/2011 | Krasner | G08B 25/009 | 340/436 |
| 7,937,066 B2* | 5/2011 | Kaltsukis | H04M 3/56 | 379/45 |
| 8,035,479 B2* | 10/2011 | Tran | G07C 9/00309 | 340/5.71 |
| 8,170,526 B2* | 5/2012 | Tieman | B60R 25/102 | 455/404.1 |
| 8,275,351 B1* | 9/2012 | Cazanas | H04L 51/02 | 455/404.1 |
| 8,280,408 B2* | 10/2012 | Ruckart | G06Q 30/02 | 455/404.2 |
| 8,380,162 B2* | 2/2013 | Matsuo | H04L 12/1895 | 455/404.1 |
| 8,417,211 B2* | 4/2013 | Hong | H04M 11/04 | 379/45 |
| 8,437,797 B2* | 5/2013 | Rothschild | H04W 4/02 | 348/116 |
| 8,483,651 B1* | 7/2013 | Zamora | H04M 11/04 | 455/404.1 |
| 8,538,374 B1 | 9/2013 | Haimo et al. | | |
| 8,577,392 B1* | 11/2013 | Pai | H04W 4/028 | 455/404.2 |
| 8,594,616 B2* | 11/2013 | Gusikhin | H04W 4/22 | 340/426.2 |
| 8,594,722 B2* | 11/2013 | Rothschild | H04W 4/02 | 382/254 |
| 8,630,608 B2* | 1/2014 | Cazanas | H04L 51/02 | 455/404.1 |
| 8,630,820 B2* | 1/2014 | Amis | G01S 19/16 | 455/404.1 |
| 8,643,486 B2* | 2/2014 | Hess | G08B 13/1409 | 340/508 |
| 8,768,292 B2* | 7/2014 | Welch | B60N 2/002 | 455/404.2 |
| 8,860,570 B2* | 10/2014 | Thomas | G06F 19/3418 | 340/426.16 |
| 8,862,092 B2 | 10/2014 | Reitnour | | |
| 8,886,158 B2* | 11/2014 | Matsuo | H04L 12/1895 | 455/404.1 |
| 8,890,656 B2* | 11/2014 | Pendse | H04W 4/22 | 340/3.1 |
| 8,897,833 B2* | 11/2014 | Rothschild | H04W 4/02 | 382/254 |
| 8,971,839 B2* | 3/2015 | Hong | H04M 11/04 | 379/45 |
| 8,977,228 B2* | 3/2015 | Nichols | G08B 13/1427 | 455/404.2 |
| 9,025,735 B2 | 5/2015 | Sieg | | |
| 9,295,024 B2 | 3/2016 | Howard et al. | | |
| 9,374,673 B2* | 6/2016 | Mendelson | G01C 21/206 | |
| 9,819,784 B1* | 11/2017 | Peter | H04M 1/72538 | |
| 2004/0006425 A1* | 1/2004 | Wood | G09B 29/10 | 701/532 |
| 2005/0136885 A1* | 6/2005 | Kaltsukis | H04M 3/56 | 455/404.1 |
| 2006/0061483 A1* | 3/2006 | Smith | G07C 5/008 | 340/13.24 |
| 2007/0167147 A1* | 7/2007 | Krasner | G08B 25/009 | 455/404.2 |
| 2009/0203349 A1* | 8/2009 | Hollstien | G08B 25/016 | 455/404.1 |
| 2009/0286504 A1* | 11/2009 | Krasner | G08B 25/009 | 455/404.1 |
| 2010/0099461 A1* | 4/2010 | Rahfaldt | H04M 1/72541 | 455/557 |
| 2010/0136944 A1* | 6/2010 | Taylor | B60R 25/00 | 455/404.1 |
| 2010/0227584 A1* | 9/2010 | Hong | H04M 11/04 | 455/404.1 |
| 2010/0311336 A1* | 12/2010 | Huotari | H04M 1/72572 | 455/41.3 |
| 2010/0323657 A1* | 12/2010 | Barnard | H04M 1/663 | 455/404.1 |
| 2011/0059720 A1* | 3/2011 | Penix | G08B 15/004 | 455/404.2 |
| 2011/0177790 A1* | 7/2011 | Monte | G08B 21/0277 | 455/404.2 |
| 2012/0052833 A1* | 3/2012 | Pendse | H04W 4/22 | 455/404.1 |
| 2012/0064855 A1* | 3/2012 | Mendelson | G01C 21/206 | 455/404.2 |
| 2012/0171988 A1* | 7/2012 | Matsuo | H04L 12/1895 | 455/404.2 |
| 2012/0171989 A1* | 7/2012 | Matsuo | H04L 12/1895 | 455/404.2 |
| 2012/0225633 A1* | 9/2012 | Nichols | G08B 13/1427 | 455/404.1 |
| 2012/0225635 A1* | 9/2012 | Esbensen | H04M 1/72541 | 455/404.2 |
| 2012/0238234 A1* | 9/2012 | Duarte | G06Q 50/01 | 455/404.1 |
| 2012/0282878 A1* | 11/2012 | Amis | G06F 3/0488 | 455/404.1 |
| 2012/0302200 A1* | 11/2012 | Esbensen | H04W 4/22 | 455/404.2 |
| 2013/0109342 A1* | 5/2013 | Welch | B60N 2/002 | 455/404.2 |
| 2013/0183925 A1* | 7/2013 | Hong | H04M 11/04 | 455/404.2 |
| 2013/0237174 A1* | 9/2013 | Gusikhin | H04W 4/22 | 455/404.1 |
| 2013/0267194 A1* | 10/2013 | Breed | H04W 4/22 | 455/404.2 |
| 2015/0094014 A1* | 4/2015 | Diamond | H04W 4/043 | 455/404.2 |
| 2015/0111521 A1* | 4/2015 | Brenton | H04W 4/22 | 455/404.1 |
| 2015/0350848 A1* | 12/2015 | Eramian | H04W 4/04 | 455/404.2 |
| 2016/0094971 A1* | 3/2016 | Duarte | G06Q 50/01 | 455/404.2 |
| 2016/0182170 A1* | 6/2016 | Daoura | H04H 20/59 | 455/3.01 |
| 2016/0262113 A1* | 9/2016 | Diamond | H04W 4/043 | |
| 2017/0018001 A1* | 1/2017 | Tunnell | G06Q 30/0255 | |
| 2017/0318146 A1* | 11/2017 | Peter | H04M 1/72538 | |

OTHER PUBLICATIONS www.edu-protect.com—seven (7) pages printed from the Internet on Aug. 19, 2015.

https://web.archive.org/web/20140530011514/http://www.edu-protect.com/—four (4) pages printed from the Internet on Aug. 19, 2015.

* cited by examiner

SYSTEM AND METHOD FOR MOBILE PERSONAL EMERGENCY RESPONSE

BACKGROUND

1. Technical Field

The present disclosure relates to a system and method for providing an emergency response. In particular, this disclosure relates to a system and method for permitting a user to activate an emergency application in a mobile device so as to provide user data and location data to a dispatch center.

2. Background

Most, if not all locations in the United States are serviced by a corresponding 911 call center. The 911 call center maybe accessed via a land line or a mobile telephone. Typical 911 call centers are effective when responding to emergency calls received from land lines (PSTS—public service telephone system). The telephone number is easily obtained based on the caller-ID system, and the physical address of the owner of that landline is quickly determined based on ownership records.

However, the location process is much more time-consuming if the emergency call is received from a mobile telephone. Typical 911 call centers or answering points do not have the ability to directly receive or otherwise determine the GPS location coordinates from a mobile device. For rapid determination of location using a mobile device, the person in contact with the 911 call center must verbally provide his or her location, typically using street address.

If a 911 call center receives an emergency call from a mobile telephone and the caller does not know his or her location, or for example cannot speak, about 30 minutes may lapse before the 911 center is able to determine an accurate location of the user based on cell tower data and other information obtained in conjunction with the cellular carrier. Although per FCC regulations, the 911 center is required to be able to determine the telephone number of the mobile caller, and obtain a coarse location to within 300 meters in a six minute period of time, such a coarse location will no doubt make it difficult to for the authorities to find the caller and timely provide aid or assistance. Further, a person using a mobile phone in an emergency situation may not be able to dial the three digits for a variety of reasons, such as visual impairment, psychological or emotional stress, and the like.

SUMMARY

A mobile personal emergency response system includes a security fob configured to be manually activated, and wirelessly transmit an emergency alert signal when activated. A mobile device contains an emergency application, which is responsive to the emergency alert signal. Upon receipt of the emergency alert signal, the emergency application obtains user profile data corresponding to the mobile device, obtains GPS location coordinates of the mobile device, and wirelessly transmits the user profile data and GPS location coordinates to a dispatch center. A location database is accessed by the dispatch center and provides an identity of a selected public service answering point corresponding to the received GPS location coordinates. A dispatcher of the dispatch center contacts the selected public service answering point and provides the user profile data and a location of the mobile device.

BRIEF DESCRIPTION OF THE DRAWINGS

The system may be better understood with reference to the following drawings and the description. The components in the figures are not necessarily to scale, emphasis instead being placed upon illustrating the principles disclosed. Moreover, in the figures, like-referenced numerals designate corresponding parts throughout the different views.

DETAILED DESCRIPTION

It is desirable to provide a system the method that permits a user in an emergency situation to quickly and easily contact a 911 call center and be able to provide the 911 call center with personnel with data about the caller and the caller's location even if the caller is impaired or is not aware of his or her physical location at the time of the call.

Figure 1:
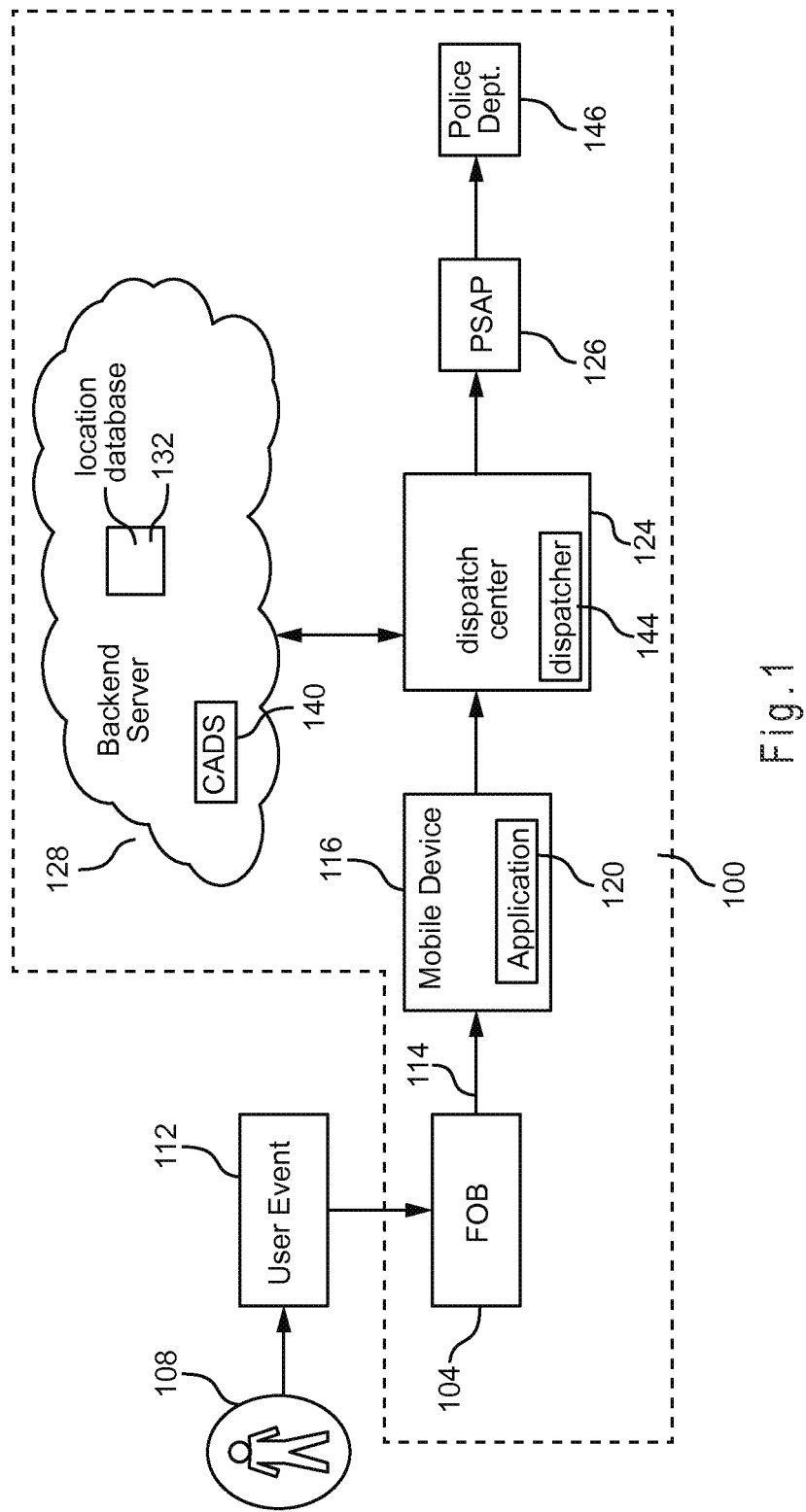
FIG. 1 is a block diagram of an exemplary system for mobile personal emergency response according to one embodiment.
Figure 2:
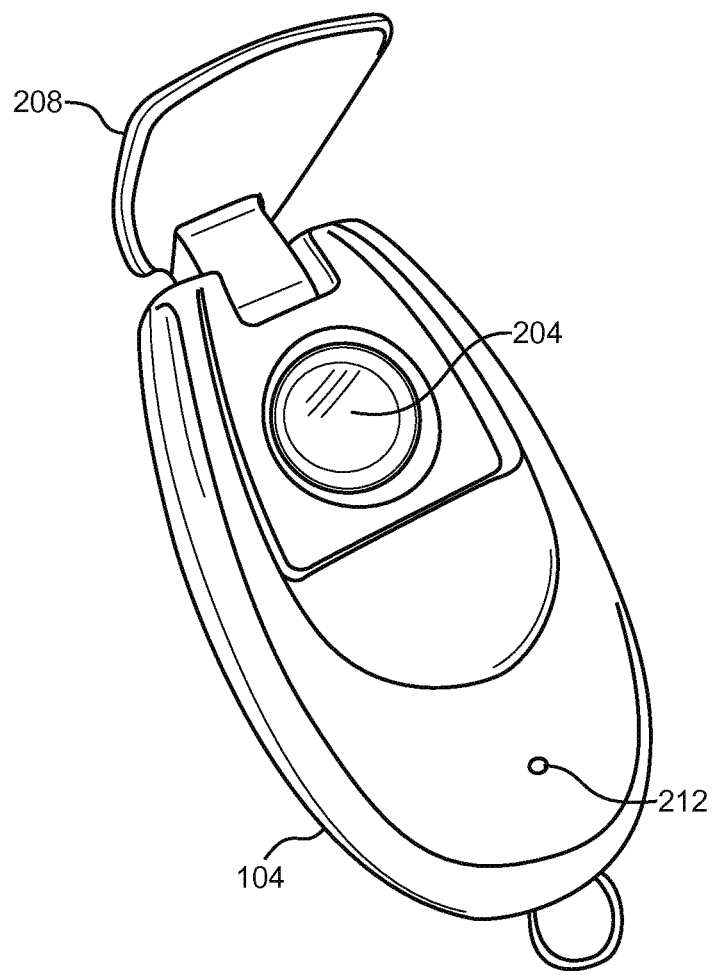
FIG. 2 is an illustration of a fob according to one embodiment.

FIG. 1 illustrates a block diagram for a system for mobile personal emergency response 100, while FIG. 2 shows a remote activation device, such as fob 104. As an overview, a user 108 has ready access to the fob 104, which may be conveniently attached to a key chain. When the user 108 activates the fob 104, where such activation is defined as a user event 112, the fob 104 transmits an emergency alert signal 114, preferably using BLUETOOTH protocol. The emergency alert signal 114 is received by the user's mobile device 116, such as a smartphone. The smartphone may support any standard operating system, such as Android, IOS, Windows, and the like. The smartphone preferably includes a GPS subsystem and supports downloadable and/or native application processing.

The mobile device 116 has been previously downloaded with an emergency application 120, and is responsive to the emergency alert signal 114, and becomes activated. When activated, the mobile device 116 obtains certain user profile data, and the GPS location coordinates of the mobile device 116, and transmits the user data and coordinates to a selected dispatch center 124 of a group of one or more dispatch centers 124a. The dispatch center 124 is coupled to a backend server 128, which preferably is remotely located relative to the dispatch center 124, or alternatively may be located within the dispatch center 124. Based on the received GPS location coordinates, the dispatch center 124 may access a location database 132, such as a 911 location database, to obtain an identity of a selected public service answering point (PSAP) 136, such as a 911 PSAP, corresponding to the received GPS location coordinates. This insures that the PSAP 136 closest to the location of user 108, meaning the location of the user's mobile device 116, is identified. In one embodiment, a computer aided dispatch system (CADS) 140 may access the 911 location database 132 to selected the appropriate 911 PSAP 136. The dispatch center 124 is preferable is supervised or staffed by one or more human operators or dispatchers 144.

The CADS 140 may be part of the backend server 128, or may be separate and remote from the backend server 128. Preferably, the backend server 128 and the CADS 140 are cloud-based systems remotely located from the dispatch center 124, but alternatively, in some embodiments, may be physically located in the dispatch center 124. The backend server 128 and/or associated memory storage may be leased from or operated by an external provider, such as Microsoft, Google, or Amazon.

Once the appropriate 911 PSAP 136 has been identified, the dispatcher 144 or operator physically located in the dispatch center 124 then contacts that selected 911 PSAP 136 and provides personnel at the 911 PSAP (the 911 dispatcher) with the user profile data and a location of the user 108. The 911 PSAP 136 is staffed with members of the 911 system. The 911 dispatcher 144 at the 911 PSAP 136 then contacts the local police or other municipal authority 146 and provides the corresponding information so that such local authorities may render assistance to the user 108.

Turning now to FIG. 2, the fob 104 may be formed of plastic or other suitable material, and includes an activation button 204 and a protective cover 208 to prevent inadvertent depression of the button when closed. Preferably, the fob 104 wirelessly communicates with the mobile device 116 using BLUETOOTH protocol, however, any suitable wireless protocol maybe it used. When the user 108 activates the fob 104, and the user profile data and GPS location coordinates are sent by the emergency application 120 and are received by the dispatch center 124, the emergency application 120 causes either the fob 104 and/or the mobile device 116 itself to briefly vibrate to provide feedback to notify that user 108 that the emergency signal has been processed and help will be on the way. Receipt of the emergency signal by the mobile device 116 essentially "wakes-up" the emergency application 120 even if the emergency application 120 is not executing in the background.

An LED indicator 212 on the fob 104 may also be illuminated. The LED indicator may provide multiple indications based on color. For example, one color may indicate a low battery condition of the fob 104, and another color may indicate that the fob 104 has moved out of range from the mobile device 116 such that it has become "unpaired" with the mobile device 116. Yet another color may indicate that the fob 104 has moved back into proximity with the mobile device 116 and has again become paired with the mobile device 116. Preferably, the fob 104 is paired with one mobile device 116.

Figure 3:
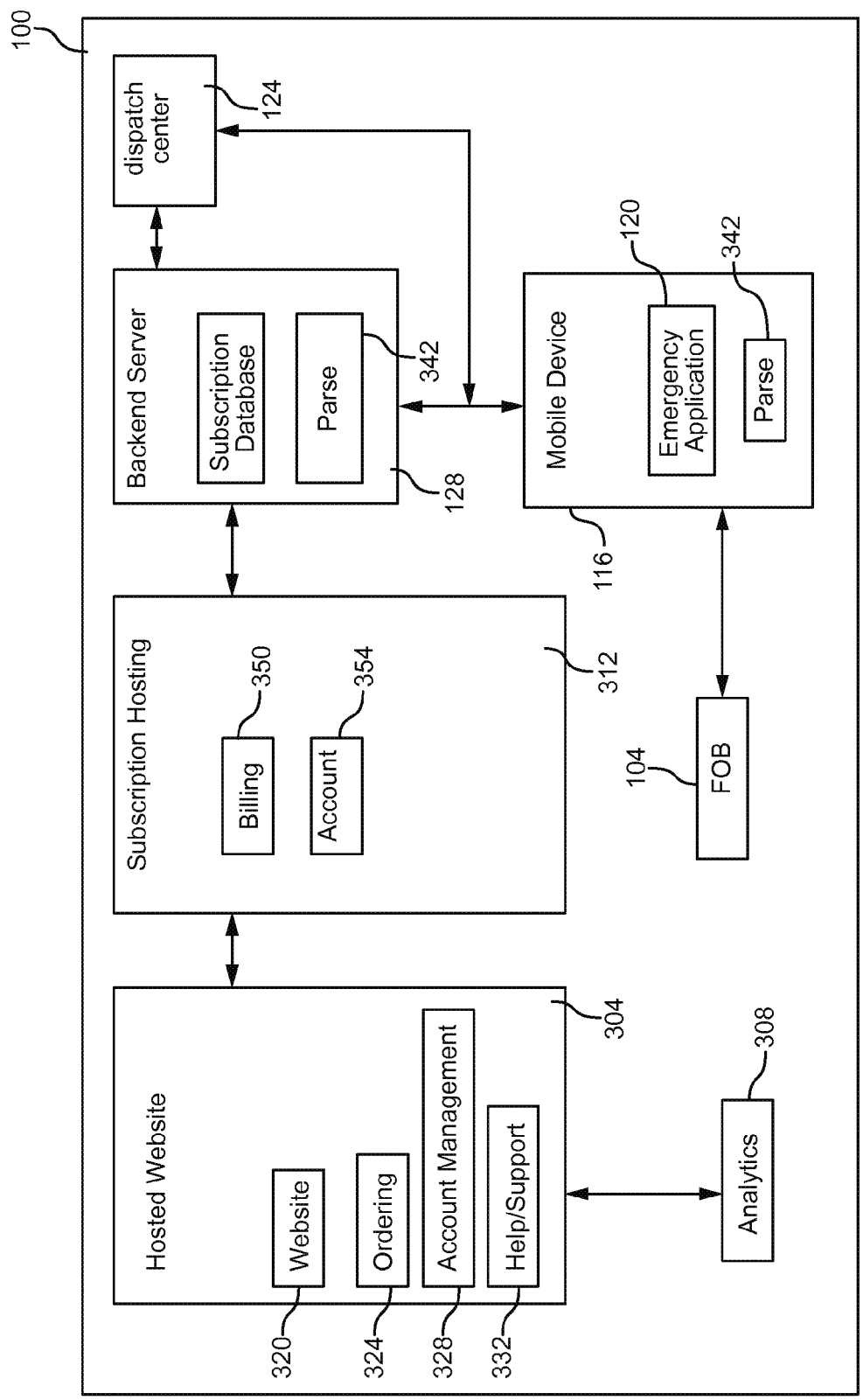
FIG. 3 is a detailed block diagram of the system for mobile personal emergency response of FIG. 1.

FIG. 3 is a detailed block diagram of the system for the mobile personal emergency response 100. The system includes a hosted website component 304, an analytics component 308, a subscription hosting component 312, the backend server 128, the dispatch center 124, and the mobile device 116. The hosted website provides the interactive webpages 320 and links that permits users to obtain the services of the system for mobile personal emergency response 100. Users may order a paid subscription (monitoring) service via the website component 304, and may order the fob 104 for delivery to the user 108 via an ordering component 324. The user 108 may also handle all aspects of his or her account management through an account management component 328 accessible via the website component 304. A help and support component 332 also provides the user 108 with the ability to obtain answers to questions and interact with customer support.

The user 108 may use the hosted website component 304 to enter user profile data into the system. Alternatively, the user 108 may enter such data using the mobile device 116. The user profile data may include the information that is typically contained in the user's drivers license, such as a photograph of the user, name, address, height, weight, gender, hair color, eye color, ethnicity, optional medical contact phone number, optional medical condition alerts, and the like. Preferably, the user profile data is stored in the backend server 128. Alternatively, the user profile data may also be stored in mobile device 116.

Regardless of where such data is stored, the data entry and formatting for storage of such data may be provided by an application referred to as Parse 342, which provides a simple and easy to use interface. Parse 342 is a commercially available application that may be executed by the backend server 128, or a portion thereof may be executed by the mobile device 116. The Parse application 342 is commercially available for a fee at https://parse.com. The Parse application 342 on the mobile device 116 may connect to and communicate with the corresponding Parse application 342 running on the backend server 128. The Parse application 342 provides database management, data storage management, and communication between the mobile device 116 and the backend server 128.

In one embodiment, the subscription hosting component 312 may be separate and apart from the hosted website component 304, and is preferably cloud-based. The subscription hosting component 312 may be operated by a separate entity that specializes in account management processes and the handling of automated and reoccurring billing and collection of subscriber fees through credit card. The subscription hosting component 312 may further provide a billing component 350 and an account component 354.

In one embodiment, the subscription hosting component 312 may be provided by "Chargify," which may provide remote hosting, and is commercially available for a fee at www.Chargify.com. The subscription hosting component 312 may also provide user account management component to permit the user 108 to create, update, and modify billing information, and personal information, such as the user profile data. In turn, the subscription hosting component 312 may store all such information in the backend server 128 for each user 108 via the Parser application. Various processors and computer systems may execute software to power the hosted website component 304, the subscription hosting component 312, and the backend server 128. Alternatively, in one embodiment, the subscription hosting component 312, and hosted website component 304 maybe consolidated and incorporated into the backend server 128 for centralized management.

The analytics component 308 may be incorporated into the hosted website component 304 or may be separate and apart therefrom. The analytics component 308 may use commercially available applications, such as SharePoint or Office 365 available from Microsoft Corporation. Such applications permit the owner or operator of the system for mobile personal emergency response 100 to evaluate performance and profitability of the system. Such applications as an operations tool for the developer, and provide project management for developing and improving the system.

Figure 4:
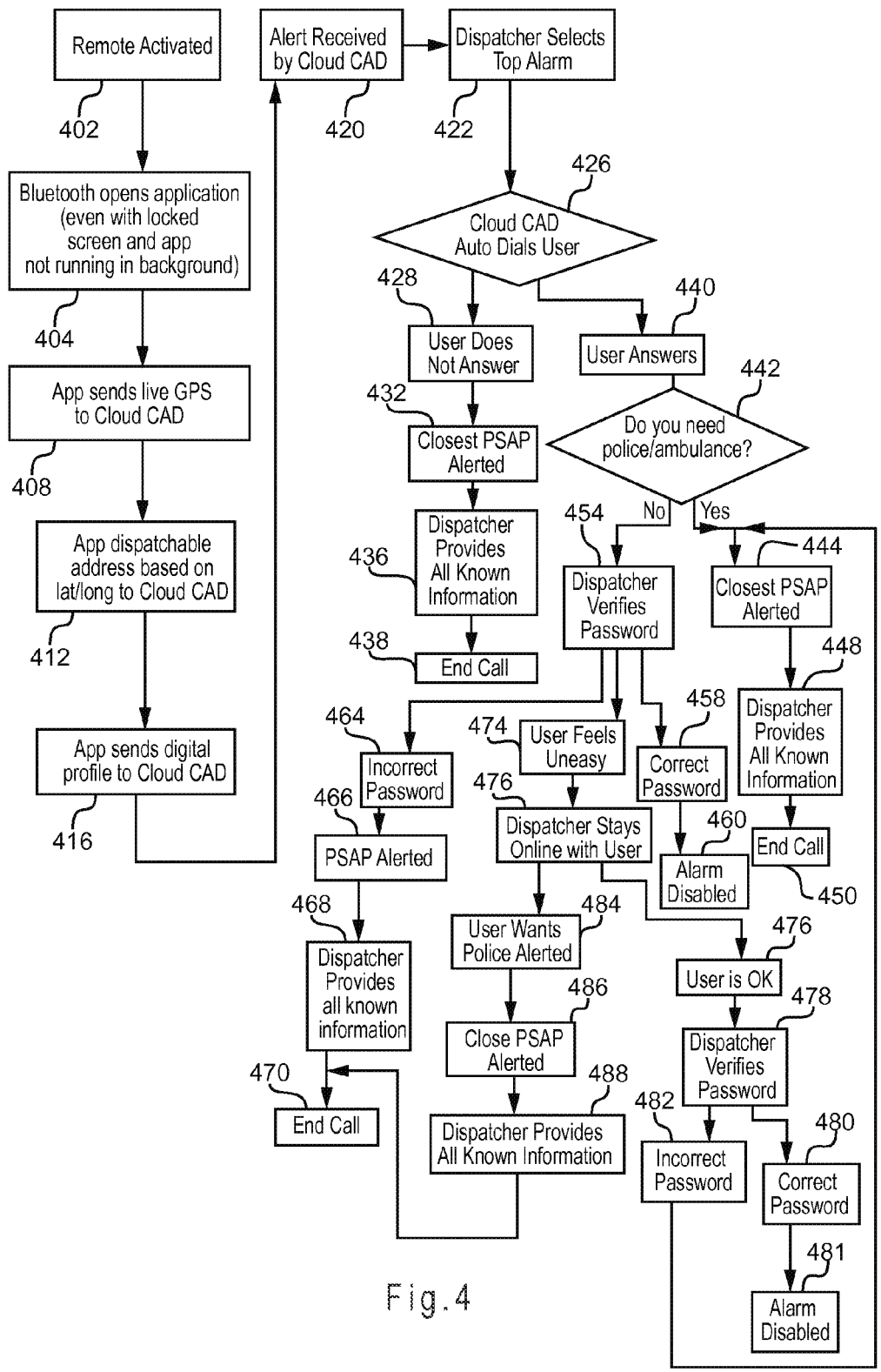
FIG. 4 is a flowchart illustrating an exemplary operational alert and response process of the system for mobile personal emergency response according to one embodiment.

FIG. 4 is a flowchart illustrating an exemplary operational process 400 of the system for mobile personal emergency response 100 according to one embodiment. After the emergency application 120 is activated by the fob (402), the emergency application 120 (even if screen is locked (404)) transmits the GPS location coordinates to the dispatch center (408). This includes latitude, longitude, and altitude (412). Additionally, a dispatchable address is transmitted. Because the dispatch center 124 is in communication with the backend server 128 and the CADS 140, the CADS 140 automatically provides a dispatchable address corresponding to the GPS location coordinates. The emergency application 120 then preferably obtains the user profile data either from the backend server 128 or alternatively, from local storage in the mobile device 116, and transmits the user profile data to the dispatch center (416).

Receipt of the user profile data and GPS location data constitutes a received alert (420). There may be more than one alert received or processed by the dispatch center 124 at one time. The received alert maybe prioritized based on various factors, such as user identity, location, and the like. The dispatcher 144 at the dispatch center 124 then selects the highest priority alert and calls the user's mobile device (422). The user's telephone number is then dialed automatically (426). If the user 108 does not answer (428), a true emergency is presumed, and the dispatcher 144 alerts the closest 911 PSAP 136. The system preferably auto-dials the PSAP. The user profile data and location data is provided to the personnel at the 911 PSAP 136 (432). The dispatcher 144 of the dispatch center 124 may provide the 911 public service answering point personnel with a physical location of the user, a physical address of the user, or the GPS location coordinates corresponding to the user (436). The call is then ended or handed off to the 911 PSAP personnel (438).

If the user 108 does answer the call from the dispatcher 144 in the dispatch center (440), the dispatcher 144 determines if the user 108 requires police or ambulance assistance (442). If the response is yes (444), the dispatcher 144 alerts the closest 911 PSAP 136 and provides the user profile data and location data to the personnel at the 911 PSAP 136. The dispatcher 144 of the dispatch center 124 may provide the 911 public service answering point personnel with a physical location of the user 108, a physical address of the user 108, or the GPS location coordinates corresponding to the user (448), as described above. The call is then ended or handed off to the 911 PSAP personnel (450).

If the user 108 indicates to the dispatcher 144 that he or she does not require police or ambulance assistance (442), the dispatcher 144 then verifies whether the user 108 is under duress and requests a password from the user (454). If the password is correct (458), the dispatcher 144 assumes a false alarm condition and this disables the alarm (460), and the call is ended. If the password given is incorrect (464), it is assumed that the user 108 is under duress, and the dispatcher 144 alerts the closest 911 PSAP 136 (466). The system preferably auto-dials the PSAP. The user profile data and location data are provided to the personnel at the 911 PSAP 136 (468). The call is then ended or handed off to the 911 PSAP personnel (470).

If the user 108 indicates to the dispatcher 144 that he or she does not require police or ambulance assistance (442), the user 108 may alternatively indicate that he or she is in a cautionary or possibly dangerous situation and feels uneasy (472), but does not yet want to involve the police. In such a situation, the dispatcher 144 will remain in verbal communication with the user (474). If the cautionary situation abates (476), the dispatcher 144 verifies the user password (478), and performs the process described above with respect to receiving either a correct password (480, 481) or an incorrect password (482), in which case, the system preferably auto-dials the PSAP.

If the cautionary situation does not abate (484), the situation may evolve into a true alert situation. In this case, dispatcher 144 alerts the closest 911 PSAP 136 (486). The system preferably auto-dials the PSAP. The user profile data and location data are provided to the personnel at the 911 PSAP (488), and the process described above with respect to contact with the 911 PSAP personnel is performed.

Figure 5:
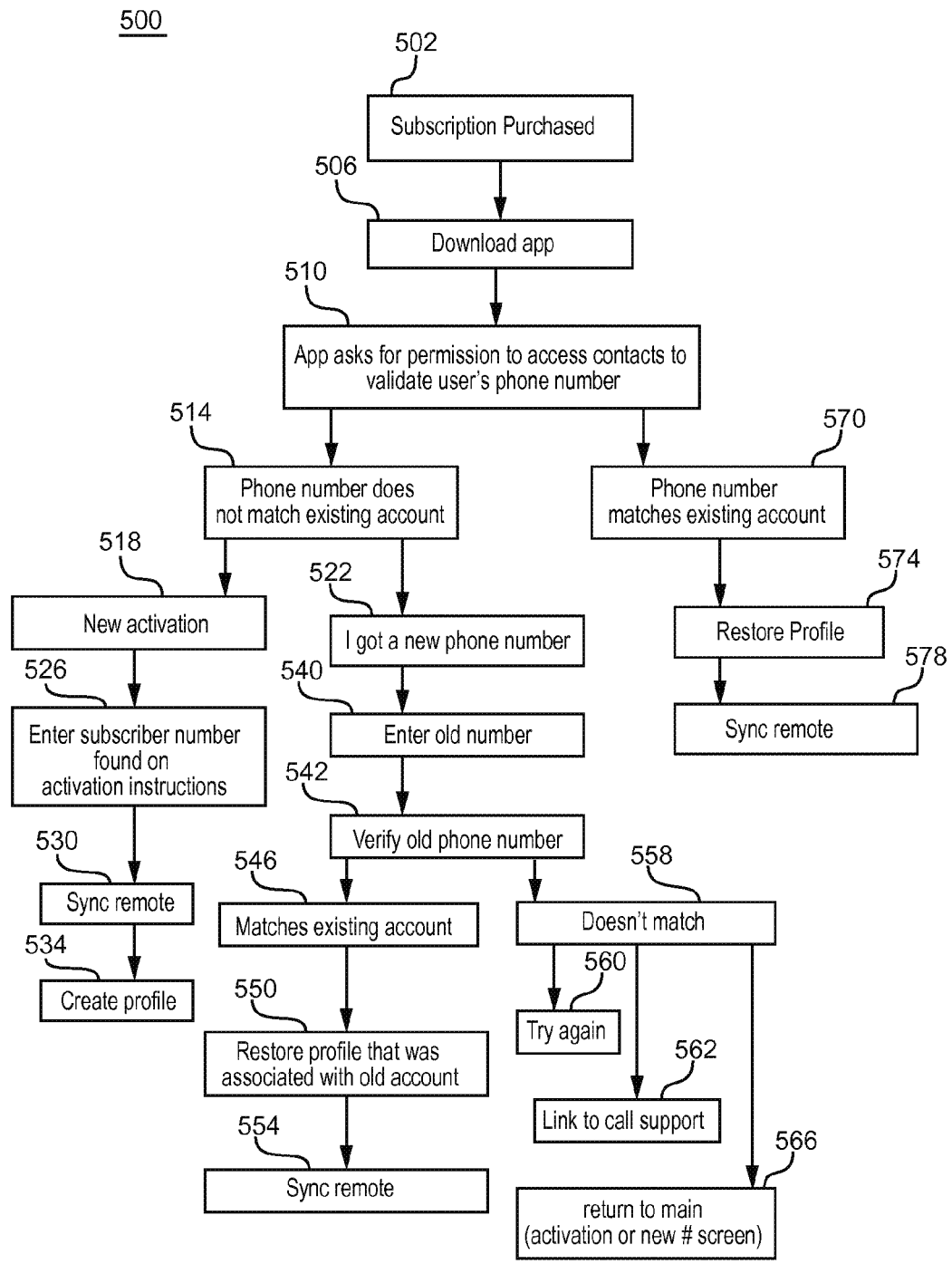
FIG. 5 is a flowchart illustrating an exemplary subscription process of the system for mobile personal emergency response according to one embodiment.

FIG. 5 is a flowchart illustrating an exemplary subscription process 500 of the system for mobile personal emergency response 100 according to one embodiment. The user 108 first purchases a subscription (502) and downloads the emergency application 120 to his or her mobile device (506), which requests authorization from the user 108 to validate the user's mobile telephone number (510). If the user's mobile telephone number does not match the existing account (514), either a new account is activated (518) or the user 108 indicate that the user 108 received a new mobile telephone number (522). If a new activation is selected (518), the user enters the new mobile telephone number (526), which is in synchronized with the backend server (530). The user profile and then created by entering the required data (534).

If the user 108 indicates that a new mobile telephone number exists (522), the user 108 is requested to enter the old telephone number (540), which is then verified (542). If the account corresponding to the old telephone number matches the existing account shown in the backend server (546), then the user profile associated with the old telephone number is restored (550), and the account is synchronized with the backend server (554).

If the user's old telephone number does not match an existing account (558), the user 108 is requested to either try again (560) or is given the option to call technical support (562). The user 108 is then returned to view the main menu (566). If the user's telephone number does match the existing account (570), the user data profile is restored (574), the data is synchronized with the backend server (578).

Figure 6:
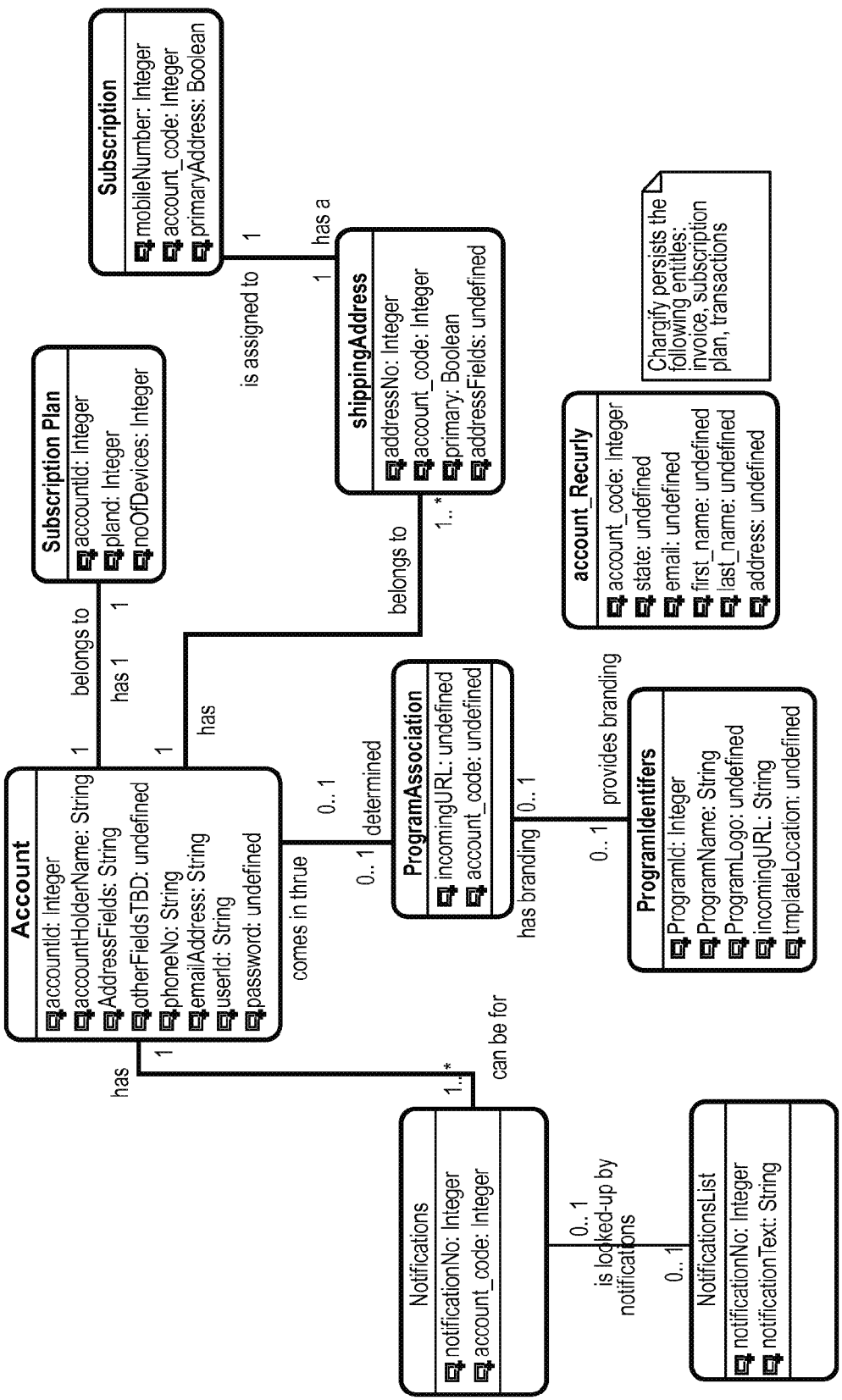
FIG. 6 shows various data fields used to populate user account and user subscription data structures according to one embodiment.

FIG. 6 shows various data fields used to populate user account and user subscription data structures. Preferably, the subscription hosting component 312 (the Chargify component) handles populating the data fields in the figures and saving such data to the backend server 128. The various data fields correspond to user account information, user notifications, user subscription plans, shipping information, program association, program identifiers, and account reoccurrence.

Figure 7:
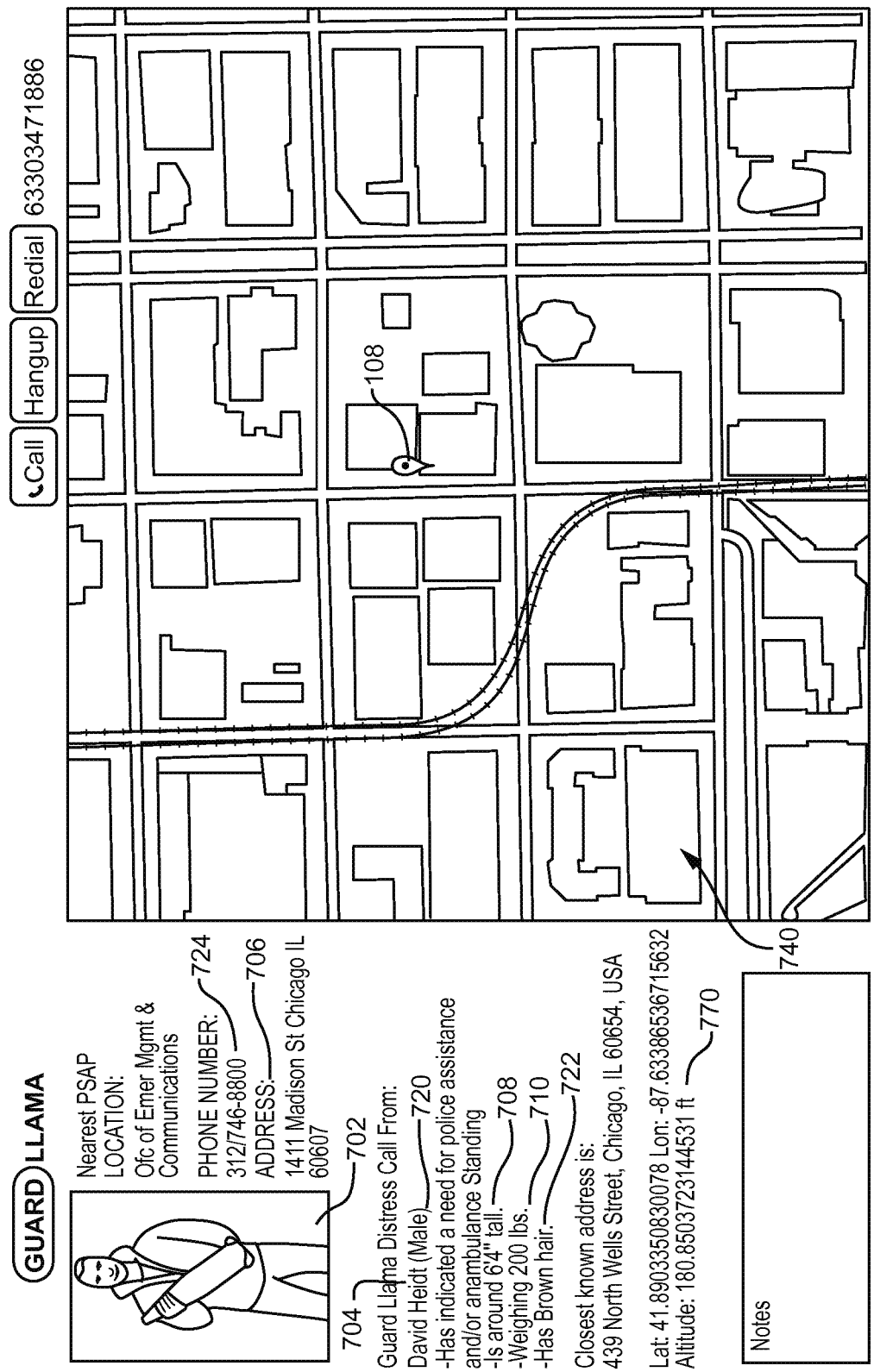
FIG. 7 illustrates a screen image of the user profile and location data received by the dispatch center according to one embodiment.

FIG. 7 is an illustrating screen image of the user profile data and location data received by the dispatch center 124. The image may contain a photograph of the user 702, name 704, closest known address 706, height 708, weight 710, gender 720, hair color 722, mobile telephone number 724. Also included is the location of the user, which may be in the form of GPS coordinates, such as longitude, latitude, and altitude 730. The location of the user 108 is also displayed on a street or local map 740, if available. Such a street map view may be generated using commercially available providers, such as GOOGLE Maps and the like.

In accordance with several embodiments described above, the dispatcher 144 at the dispatch center 124 verbally provides the user account profile data and dispatchable address to the 911 PSAP 136 because existing 911 PSAP centers are not equipped to receive digital data directly from an external source. However, it is anticipated that at some future date, 911 PSAP centers may be upgraded to be able to directly receive multimedia information and digital data from the dispatch center 124, such as the user profile data and the GPS location coordinates. When such an improved 911 system is available, the dispatcher 144 may be able to facilitate the direct transfer of the received user profile and GPS location coordinates to the selected 911 center. However, until such upgraded 911 centers exist, the dispatcher 144 preferably contacts the selected 911 center and verbally (or perhaps by email) provides the user profile data and the location of user 108.

In some embodiments, two or more dispatch centers may be provide, where the emergency application 120 may transmit the user profile data and GPS location coordinates corresponding to the respective mobile device, to a selected one of the two or more dispatch centers. Selection of the dispatch center may be based on geographical proximity to the user's mobile device or maybe based on available resources at a particular dispatch center. For example, if one dispatch center is handling a heavy call volume, the alert and data may be sent instead to an alternate dispatch center.

In some embodiments, once an alert is received, the audio and video capabilities of the user's mobile device may be activated. The audio and video captured maybe stored in the mobile device and/or maybe transmitted in real-time to the dispatch center 124. Further, the map location shown in FIG. 7 may be updated in real-time to show the changing position of the user 108, along with an updated dispatchable address or closest location indicator. Such updated information but also be forwarded to the selected 911 PSAP 136. Also note that the specific number of "911" may be any number that may be designated as part of emergency-type services.

Figure 8:
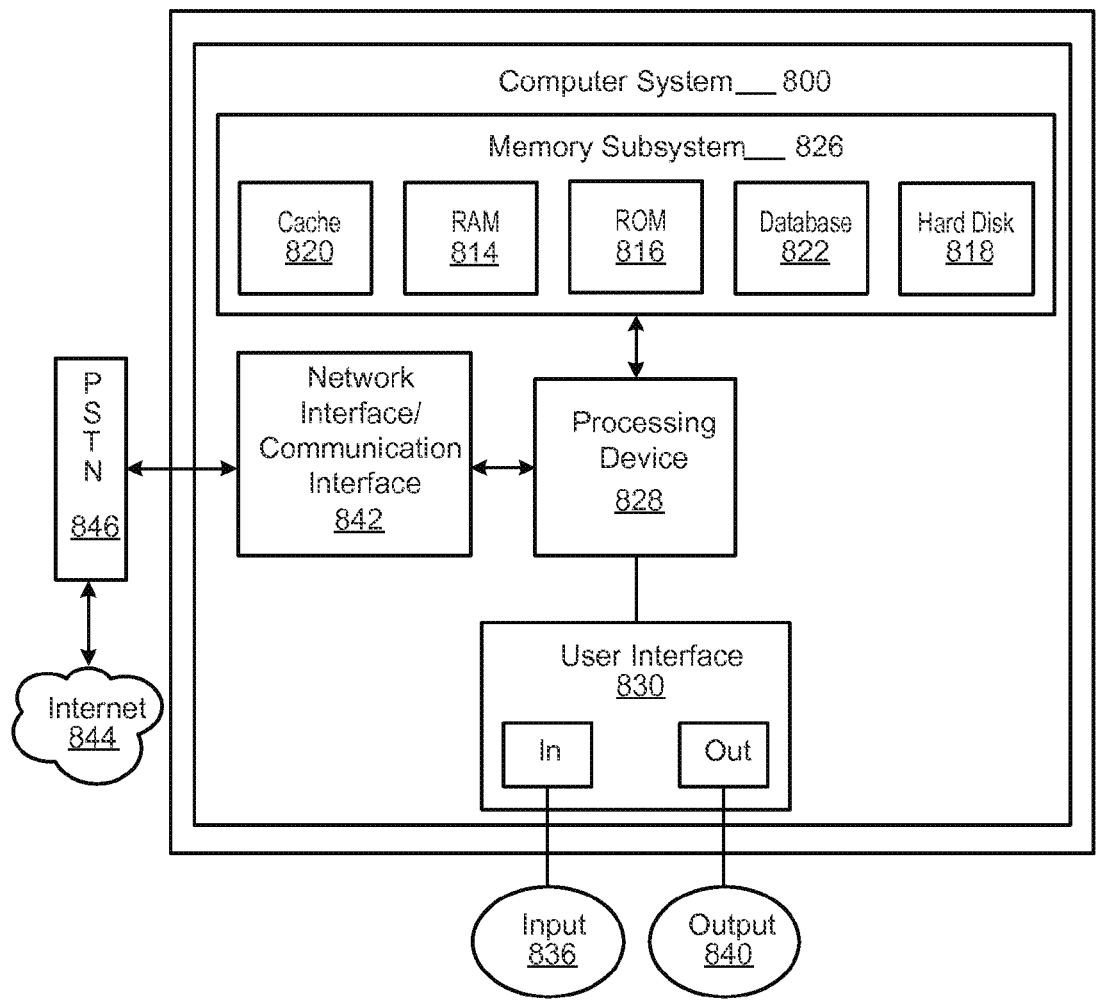
FIG. 8 is a block diagram of an exemplary computer system or server, such as the backend server or other computer system, according to one embodiment.

FIG. 8 is a high-level hardware block diagram of one embodiment of a computer system hardware embodiment, which may be part of or incorporated into the backend server 128, and which may perform some or all of the functions of some of the components, modules, and/or subsystems described above. Such a computer system 800 may be embodied as a system cooperating with computer hardware components and/or as computer-implemented methods and is shown in FIG. 8 as a high-level hardware block diagram of a system computer 800 that may be used to execute software or logic to implement the processing of the components, modules, and/or subsystems described above.

The computer 800 may be a personal computer and may include various hardware components, such as RAM 814, ROM 816, hard disk storage 818, cache memory 820, database storage 822, and the like (also referred to as "memory subsystem 826"). The computer 800 may include any suitable processing device 828, such as a computer, microprocessor, RISC processor (reduced instruction set computer), CISC processor (complex instruction set computer), mainframe computer, work station, single-chip computer, distributed processor, server, controller, micro-controller, discrete logic computer, and the like, as is known in the art. For example, the processing device 828 may be an Intel Pentium® microprocessor, x86 compatible microprocessor, or equivalent device, and may be incorporated into a server, a personal computer, or any suitable computing platform.

The memory subsystem 826 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 830 may be coupled to the computer system 800 and may include various input devices 836, such as switches selectable by the system manager and/or a keyboard. The user interface also may include suitable output devices 840, such as an LCD display, a CRT, various LED indicators, a printer, and/or a speech output device, as is known in the art.

To facilitate communication between the computer 800 and external sources or other components, modules, and subsystems, a communication interface 842 may be operatively coupled to the computer system 800. The communication interface 842 may be, for example, a local area network, such as an Ethernet network, intranet, Internet, or other suitable network 844. The communication interface 842 may also be connected to a public switched telephone network (PSTN) 846 or POTS (plain old telephone system), which may facilitate communication via the Internet 844. Any suitable commercially-available communication device or network may be used.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A mobile personal emergency response system, comprising:
   a security device configured to receive an input and wirelessly transmit an emergency alert signal responsive to receiving the input;
   one or more non-transitory computer-readable media storing instructions that, when executed by a mobile device, cause the mobile device to:
   responsive to receiving the emergency alert signal, wake up an emergency application stored on the mobile device from a suspended execution state;
   obtain stored user profile data comprising an image of a user;
   obtain GPS location coordinates of the mobile device;
   wirelessly transmit an emergency signal comprising the user profile data and GPS location coordinates to a dispatch system; and
   responsive to an indication that the emergency signal was processed, cause the security device to vibrate; and
   wherein the dispatch system is configured to display, responsive to receiving the user profile data and the GPS location coordinates, a graphical interface comprising the GPS location coordinates and the image of the user.

2. The system according to claim 1, wherein the emergency application obtains the user profile data from memory storage local to the mobile device.

3. The system according to claim 1, wherein the security device comprises a short-range wireless transceiver, wherein the security device is configured to transmit the emergency alert signal using the short-range wireless transceiver.

4. The system according to claim 1, wherein the dispatch system automatically provides a public service answering point with a physical location of the mobile device, a physical address of the mobile device, or the GPS location coordinates corresponding to the mobile device.

5. The system according to claim 1, wherein when the emergency application responds to the emergency signal, the emergency application enables a GPS location tracking feature of the mobile device.

6. The system of claim 3, wherein the dispatch system is configured to access a location database and to determine an emergency public service answering point that is closest to the received GPS location coordinates.

7. The system of claim 6, wherein the mobile device is configured to:
   responsive to receiving the emergency alert signal from the security device, activate a camera and a microphone of the mobile device; and
   cause, by the emergency application, the mobile device to transmit one or more images captured by the camera and audio captured by the microphone.

8. The system according to claim 7, wherein the emergency application obtains the user profile data from a remote server.

9. A method comprising:
   in response to receiving, by a mobile device and from a security device, an emergency alert signal, waking up an emergency alert application;
   responsive to receiving the emergency alert signal, causing, by the emergency alert application, the mobile device to transmit, to a dispatch system, an emergency signal comprising a location of the mobile device and information about a user of the mobile device; and
   responsive to an indication that the emergency signal was processed by the dispatch system, causing, by the emergency alert application, the security device to vibrate.

10. The method of claim 9, further comprising:
    responsive to receiving the emergency alert signal, activating, by the emergency alert application, a camera of the mobile device; and
    causing, by the emergency alert application, the mobile device to transmit one or more images captured by the camera.

11. The method of claim 10, further comprising:
    responsive to receiving the emergency alert signal, activating, by the emergency alert application, a microphone of the mobile device; and
    causing, by the emergency alert application, the mobile device to transmit audio captured by the microphone.

12. A method comprising:
    in response to receiving, by a mobile device and from a security device via a short-range wireless interface of the mobile device, an emergency alert signal, waking up an emergency alert application;
    activating, by the emergency alert application, a camera of the mobile device;
    causing, by the emergency alert application, the mobile device to transmit, to a dispatch system, one or more images captured by the camera, a location of the mobile device, and information about a user of the mobile device; and
    responsive to an indication that the transmission was processed by the dispatch system, causing, by the emergency alert application, the security device to vibrate.

13. The method of claim 12, further comprising:
    responsive to receiving the emergency alert signal, activating, by the emergency alert application, a microphone of the mobile device; and
    causing, by the emergency alert application, the mobile device to transmit audio captured by the microphone.

14. The system of claim 1, wherein the user profile data further comprises medical information for the user and a physical description of the user.

15. The method of claim 9, wherein the information about the user of the mobile device comprises one or more of an image of the user, a physical description of the user, and medical information of the user.

16. The method of claim 12, wherein the information about the user of the mobile device comprises one or more of an image of the user, a physical description of the user, and medical information of the user.

* * * * *